United States Patent
Blinick et al.

(10) Patent No.: US 7,340,595 B2
(45) Date of Patent: Mar. 4, 2008

(54) MULTIPLEX EXECUTION-PATH SYSTEM

(75) Inventors: Stephen L. Blinick, Tucson, AZ (US); Charles S. Cardinell, Tucson, AZ (US); Ricardo S. Padilla, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/031,605

(22) Filed: Jan. 7, 2005

(65) Prior Publication Data

US 2006/0155979 A1    Jul. 13, 2006

(51) Int. Cl.
G06F 9/445 (2006.01)
G06F 15/177 (2006.01)

(52) U.S. Cl. .......... 713/2; 713/1; 713/2; 713/100; 714/2; 714/6

(58) Field of Classification Search ............ 713/2
See application file for complete search history.

(56) References Cited

U.S. PATENT DOCUMENTS 6,205,548 B1 * 3/2001 Hasbun ............... 713/2
6,754,818 B1 * 6/2004 Lee et al. ............... 713/2
6,892,323 B2 * 5/2005 Lin .................. 714/36
6,957,328 B2 * 10/2005 Goodman et al. ........ 713/2

* cited by examiner

Primary Examiner—A. Elamin
Assistant Examiner—Nitin C. Patel
(74) Attorney, Agent, or Firm—Quarles & Brady LLP

(57) ABSTRACT

A multiple execution-path flash system includes a main flash image with primary and secondary POST and Boot executable files. The secondary executables are offset from the primary executables by a predetermined offset address. If corrupted data is encountered during Boot, the exception handler sets an offset bit resulting in the predetermined offset address being added to the current instruction address. If corrupted data is encountered in the secondary executables, the offset bit is reset. An optional redundant flash image may also be used. A failure at the same relative address in the primary and secondary executables of the main flash image will cause the exception handler to transfer control to the redundant flash image. A subsequent failure at the same relative address in the primary and secondary executables of the redundant flash image will cause the redundant exception handler to transfer control back to the main flash image.

7 Claims, 10 Drawing Sheets

MULTIPLEX EXECUTION-PATH SYSTEM

BACKGROUND OF THE INVENTION

1. Field of the Invention

This invention is related in general to the field of bootable input/output adapters. In particular, the invention consists of a device for providing multiple alternate boot paths.

2. Description of the Prior Art

In a digital processing system, input/output cards referred to as adapters are often used to communicate with devices external to the digital processing system. These adapters traditionally communicate with a central processor of the digital processing system or with each other through a data bus or network. An adapter may be an embedded system, i.e., may include a processing device that must be initialized during power-on and activation. During power-on self-test ("POST"), an adapter's hardware is exercised and diagnostics are performed. During Bootup, an adapter with an embedded processor will initialize the processor and other hardware external to the processor such as memory, and will perform an initial microcode load ("IML").

Executable programs are stored on the adapter and loaded into the processor during the Boot process. These executables may include a POST executable for performing the power-on self-test, a Kernel or Boot executable responsible for directing the Bootup, and an Exception Handler executable for identifying errors during the Boot process and taking corrective action.

These executable programs are usually maintained in a memory device on the adapter. A common memory device used for this purpose is a Flash memory. The Flash memory is a non-volatile memory device that maintains its data, even when its power source has been turned off or disconnected. A traditional embedded system, such as an adapter, will include a flash image that includes the Kernel, POST, and exception handling executables. A system with a single-path flash includes a single flash image with only one Kernel executable, one POST executable, and one exception handling executable.

A problem may occur if one or more memory locations within the Flash device contain erroneous information. This may occur if the one or more memory locations are defective, an external occurrence has caused the data in the memory locations to become corrupted, or if the process of programming the flash device was interrupted or aborted. Encountering a flash image problem in a single-path flash system requires that the flash be reprogrammed, that the flash device be replaced, or that the adapter possessing the flash device be replaced.

One potential solution is to utilize a redundant flash image including a copy of the Kernel, POST, and exception handler executables. If corrupt information is encountered during the POST of Boot process of the primary flash image, the primary exception handling executable will switch control to the redundant flash image. If the redundant flash image is viable, the POST and Boot processes are loaded into the processor and executed. Alternatively, the Boot and POST processes of the embedded system may be monitored by an external device, such as another adapter or embedded system. If the primary exception handling executable generates an error message, the external device may swap the redundant flash image for the primary flash image and reset the adapter. However, the process of swapping image files and resetting the adapter may take a significant amount of time. Additionally, if the redundant flash image is also corrupted, the adapter will fail to execute its POST and Boot executables requiring that the flash images be programmed, the flash devices be replaced, or the adapter be replaced. Accordingly, it would be advantageous to have a system for providing an alternate boot path that does not require swapping a primary flash image with a redundant flash image. Additionally, it is desirable to have a system for booting from flash images, even if all the flash images include areas of corrupted information.

SUMMARY OF THE INVENTION

The invention disclosed herein utilizes a multiple execution-path flash system to allow for successful loading of executable files. A main flash image includes a primary POST executable, a primary Boot executable, and an exception handling executable. Additionally, the main flash image includes a secondary POST executable and a secondary Boot executable, both of which are offset from their corresponding primary executables by a predetermined offset address. If an error condition occurs when loading either the primary POST executable or the primary Boot executable, the exception handling executable will set an offset bit. If the offset bit has been set, a predetermined offset address will be added to the current instruction address being loaded by the processor, resulting in instructions being loaded into the process from a secondary executable.

If another error condition occurs during the execution of the secondary executables, the exception handling executable will reset the offset bit. The current instruction address will not be offset by the predetermined offset address and control will return to the primary executables. In this manner, multiple data corruptions may be encountered without interrupting the POST and Boot processes.

If both the primary executables and the secondary executables contain corrupt information at the same relative locations, the exception handler cannot overcome an execution problem by setting or resetting the offset bit. Rather, the exception handler must turn control over to a redundant flash image. Alternatively, an external process may recognize an error code generated by the exception handler, swap the redundant flash image with the primary flash image, and reset the adapter. If the redundant flash image also includes a multiple-path execution path, corrupted data within the redundant flash image may be bypassed as in the primary flash image.

Yet another advantage of the invention is realized if corrupted data is encountered at the same relative addresses of the primary and secondary executables within the redundant flash image. If this occurs, the exception handling executable within the redundant flash image can turn control back over to the main flash image. Alternatively, an external process may recognize the error code generated by the redundant exception handler and swap the redundant flash image with the main flash image again, returning control to the main flash image after resetting the adapter.

If control is transferable between the main and redundant flash images without resetting the adapter, the POST and Boot processes will complete unless corrupted information is encountered at the same relative memory locations within the primary and second executables of both the main and redundant flash images. If the adapter must be reset after transferring control between the main and redundant flash images, then the POST and Boot processes will complete unless corrupted information is encountered at first relative memory locations within the primary and secondary executables of the main flash image and corrupted information is encountered at second relative memory locations within the primary and secondary executables of the redundant flash image.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a multiple execution-path flash system. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
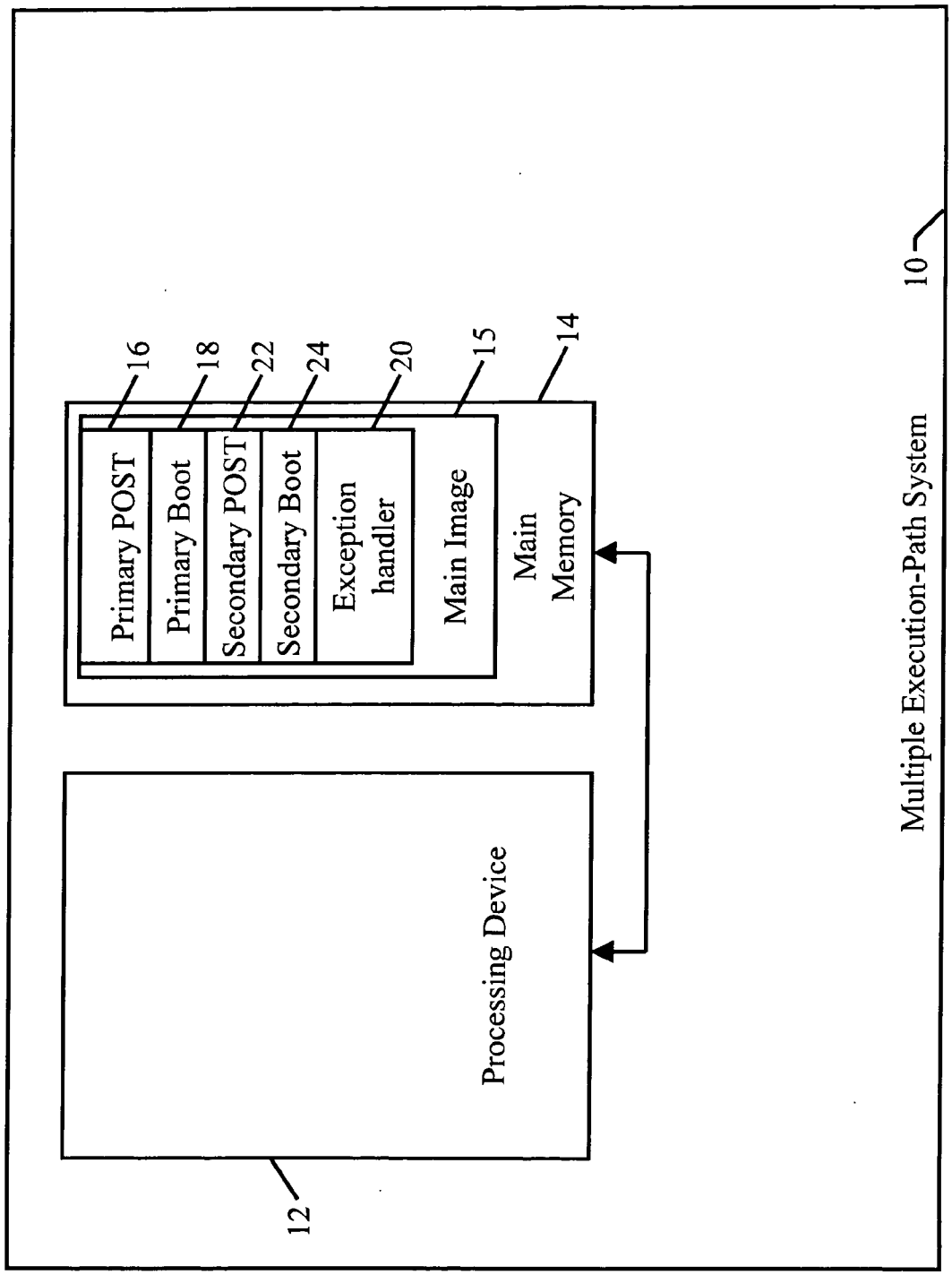
FIG. 1 is a block diagram illustrating a multiple execution-path flash system including a processor and a main memory device.

Referring to figures, wherein like parts are designated with the same reference numerals and symbols, FIG. 1 is a block diagram illustrating a multiple execution-path flash system 10 including a processor 12 and a main memory device 14. The processor can be any type of computing device such as a microprocessor, application-specific integrated circuit ("ASIC"), field-programmable gate array ("FPGA"), or other programmable logic device ("PLD"). The main memory device 14 can be any type of non-volatile memory such as a flash memory device. The main memory device 14 includes a main flash image 15 including a primary power-on self test ("POST") executable file ("post executable") 16, a primary Boot executable file ("boot executable") 18, a main exception handling executable file ("main exception handler") 20, a secondary post executable 22, and a secondary Boot executable 24.

Figure 2A:
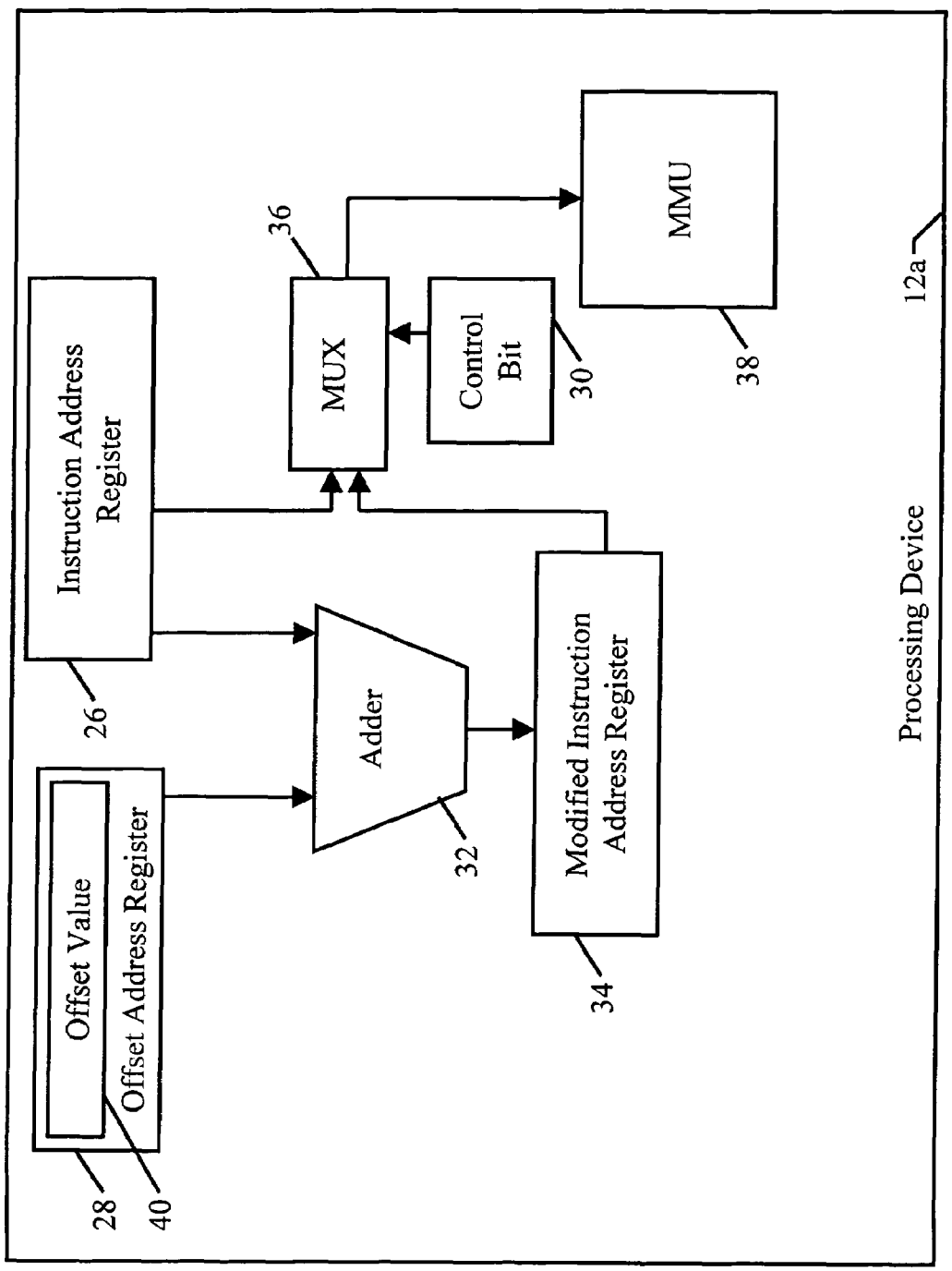
FIG. 2a is a block diagram illustrating a first embodiment of the processor of FIG. 1.
Figure 2B:
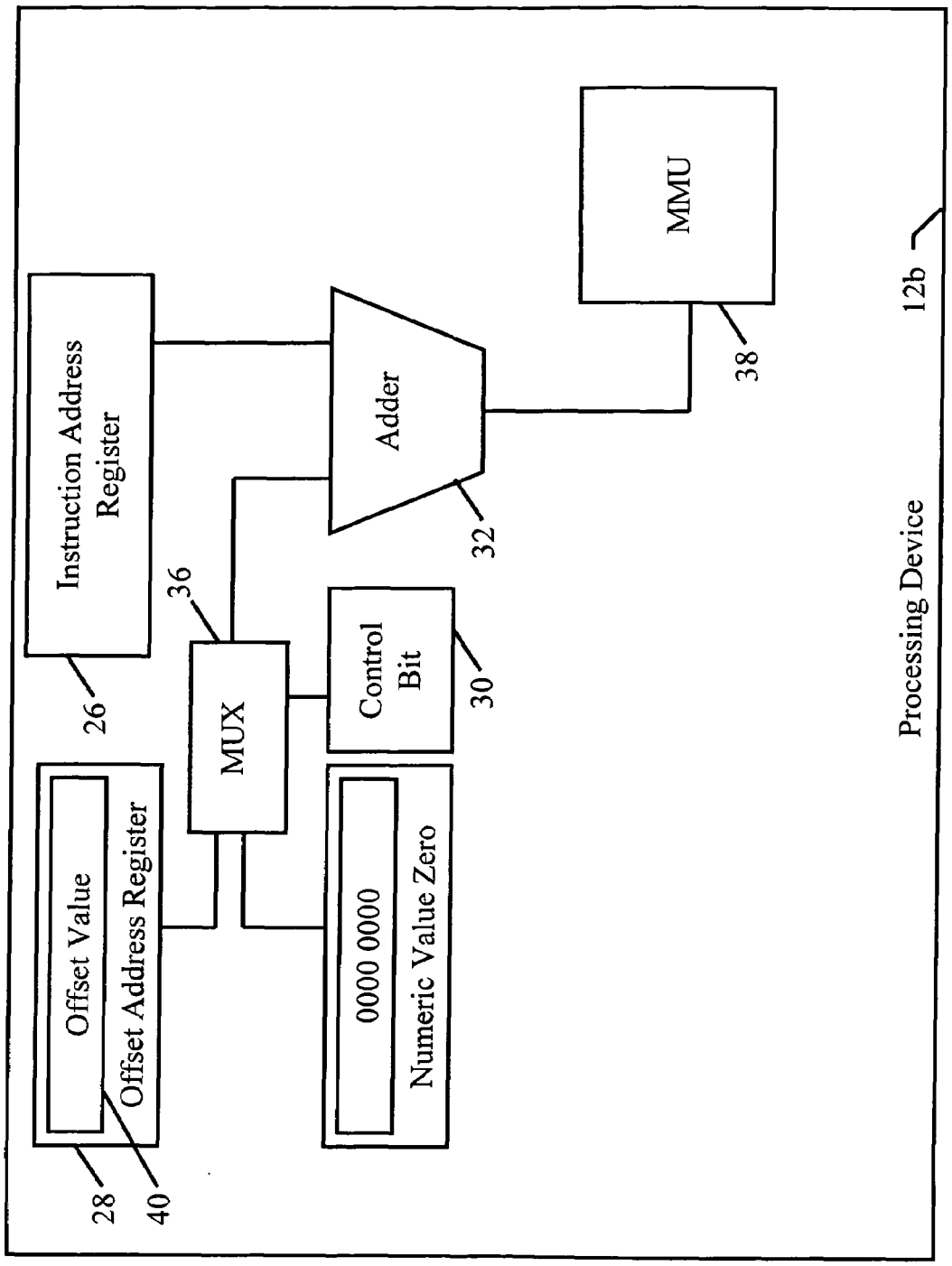
FIG. 2b is a block diagram illustrating a second embodiment of the processor of FIG. 1.

FIG. 2a illustrates one embodiment of the processor according to the invention. The processor 12a includes an instruction address register 26, an offset address register 28, a first offset bit 30, and a first adder 32 for adding the content of the offset address register 28 to the content of the instruction address register 26. In this embodiment of the invention, the output of the first adder 32 is held in a modified instruction address register 34 and the offset bit controls a multiplexor ("mux") 36. If the first offset bit 30 is set, i.e., if the value of the first offset bit 30 is a logical high, the content of the modified instruction address register 34 is passed through the mux 36 to the memory management unit ("MMU") 38. Otherwise, the content of the instruction address register 26 is passed to the MMU 38. FIG. 2b illustrates another embodiment of the processor 12b wherein the first offset bit 30 is used to multiplex the content of the offset address register 28 or a numeric value of zero into the adder 32, with the output of the adder being sent to the MMU 38. In an embedded processor, the switching mechanism is accomplished via the use of base address translation ("BAT") registers that are maintained by system software. These processor registers take care of the logical to physical mapping of the execution address.

The primary and secondary executables 16,18,22,24 (FIG. 1) are located within the memory device 14 at specific physical addresses. The starting addresses of the secondary executables are offset from the starting addresses of the primary executables by an amount equal to the content of the offset address register 28 (FIG. 2a). If the value of the first offset bit 30 is a logic low, then the processor loads instructions from the primary executables 16,18. If the value of the first offset bit 30 is a logic high, then the processor loads instructions from the secondary executables 22,24.

Figure 3A:
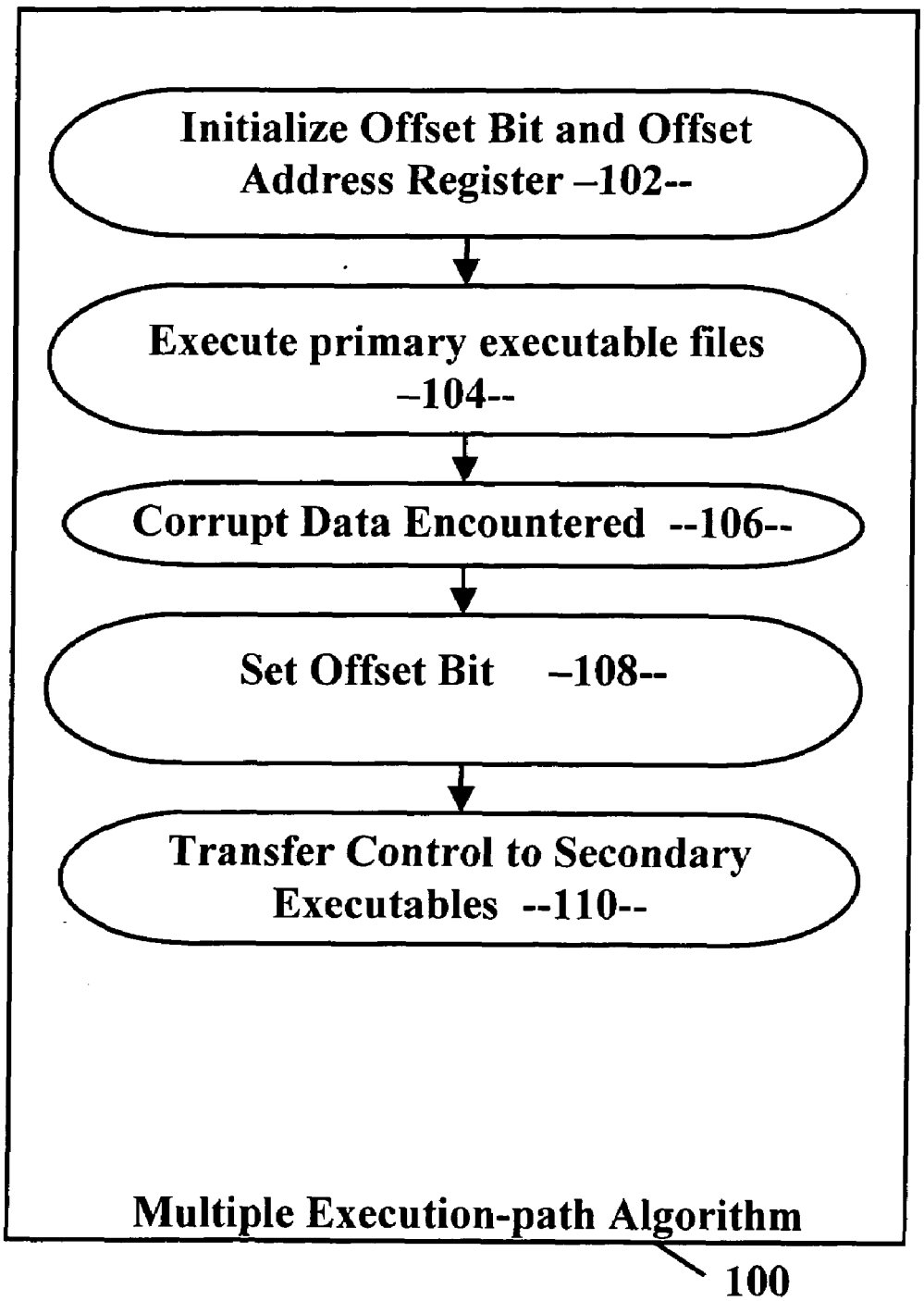
FIG. 3a is a flow chart illustrating a multiple execution-path algorithm utilizing primary and secondary executables according to the invention.

If corrupt data is encountered in a primary executable, the main exception handler 20 sets the first offset bit 30, resulting in control being passed to the secondary executables. Subsequently, if corrupt data is encountered in a secondary executable, the main exception handler resets the first offset bit 30, allowing control to return to the primary executables. In this manner, a Boot process can complete, even if numerous instances of corrupt data exists in both the primary and secondary executables. The Boot process will only fail if corrupt data exists at the same relative addresses within the primary and secondary executables. This process is more fully illustrated by the multiple execution-path algorithm 100 as shown in FIG. 3a.

Figure 3B:
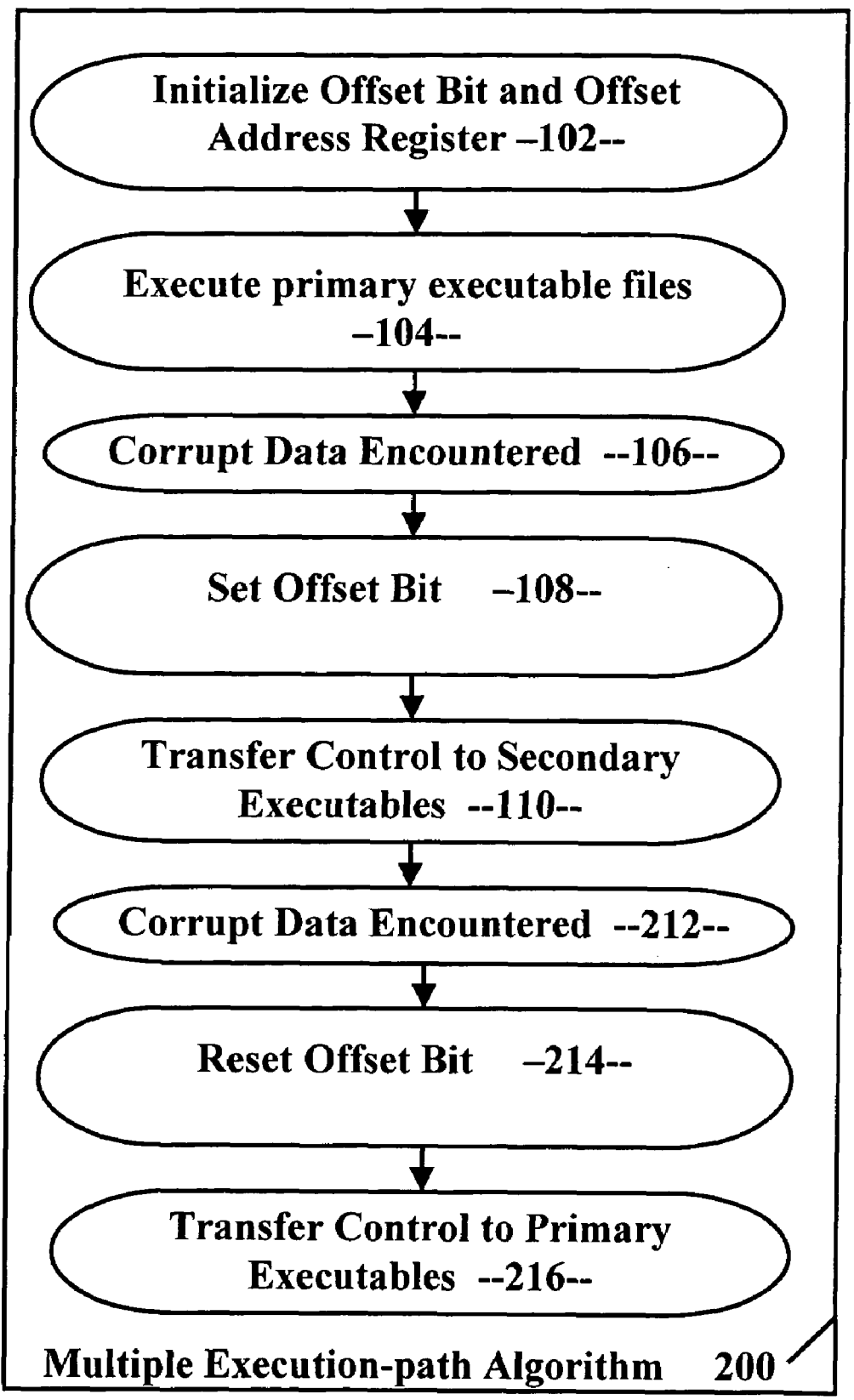
FIG. 3b is a flow chart illustrating the algorithm of FIG. 3a with the added step of returning control back to the primary executables.

In step 102, the offset bit 30 is initialized to a logic low and an offset value 40 is loaded into the offset address register 28. In step 104, the primary executables 16,18 are executed by the processor. In step 106, an error condition is encountered. The main exception handler 20 sets the first offset bit 30 to a logic high in step 108. In step 110, control transfers to the secondary executables 22,24. The flow chart of FIG. 3b illustrates another embodiment of a multiple execution-path algorithm 200 similar to that shown in FIG. 2a with the added steps of encountering an error condition while executing the secondary executables (step 212), resetting the first offset bit 30 to a logic low (step 214), and transferring control back to the primary executables (step 216).

Figure 4:
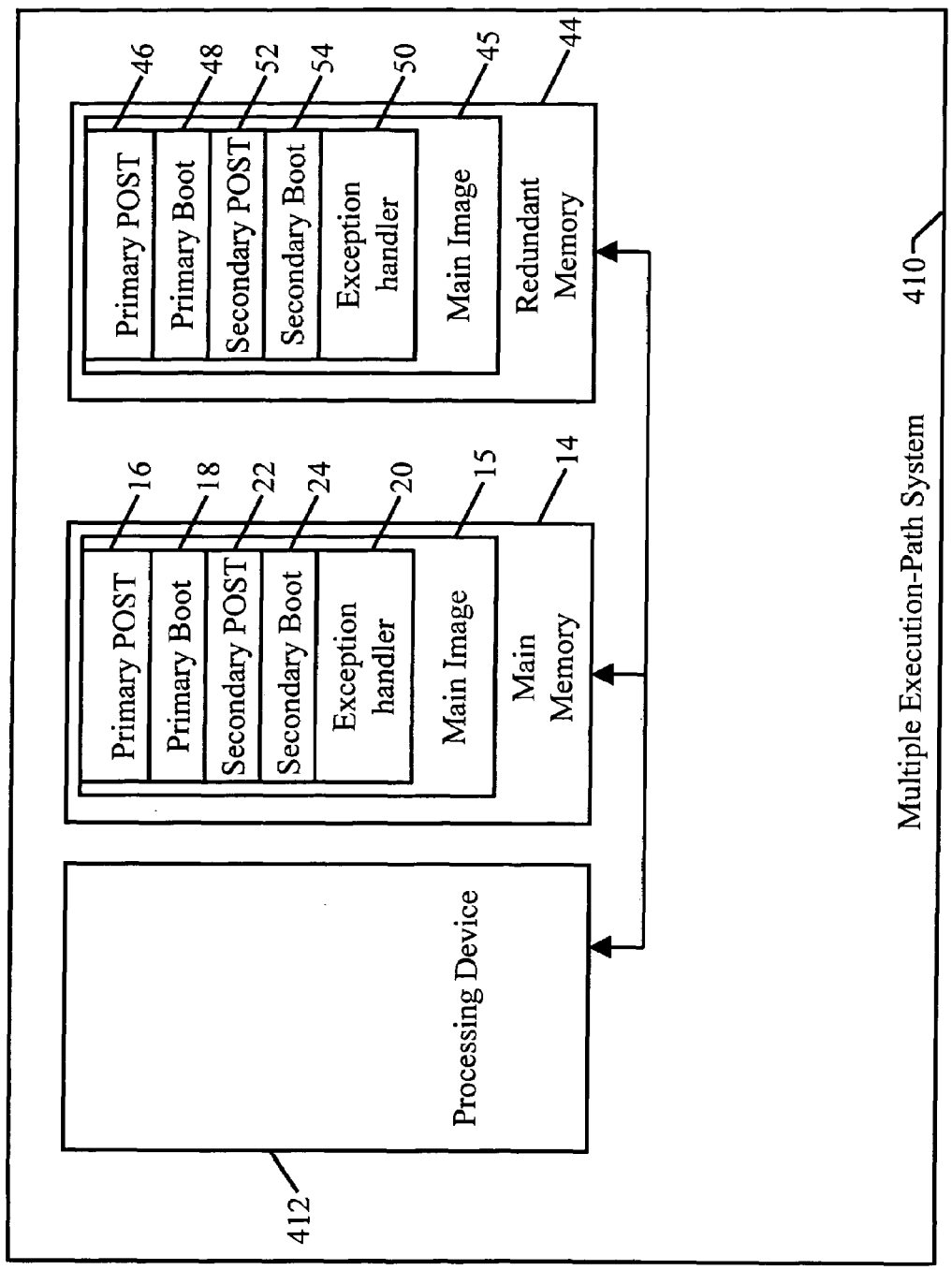
FIG. 4 is a block diagram illustrating the multiple execution-path flash system of FIG. 1 including a redundant memory device.
Figure 5:
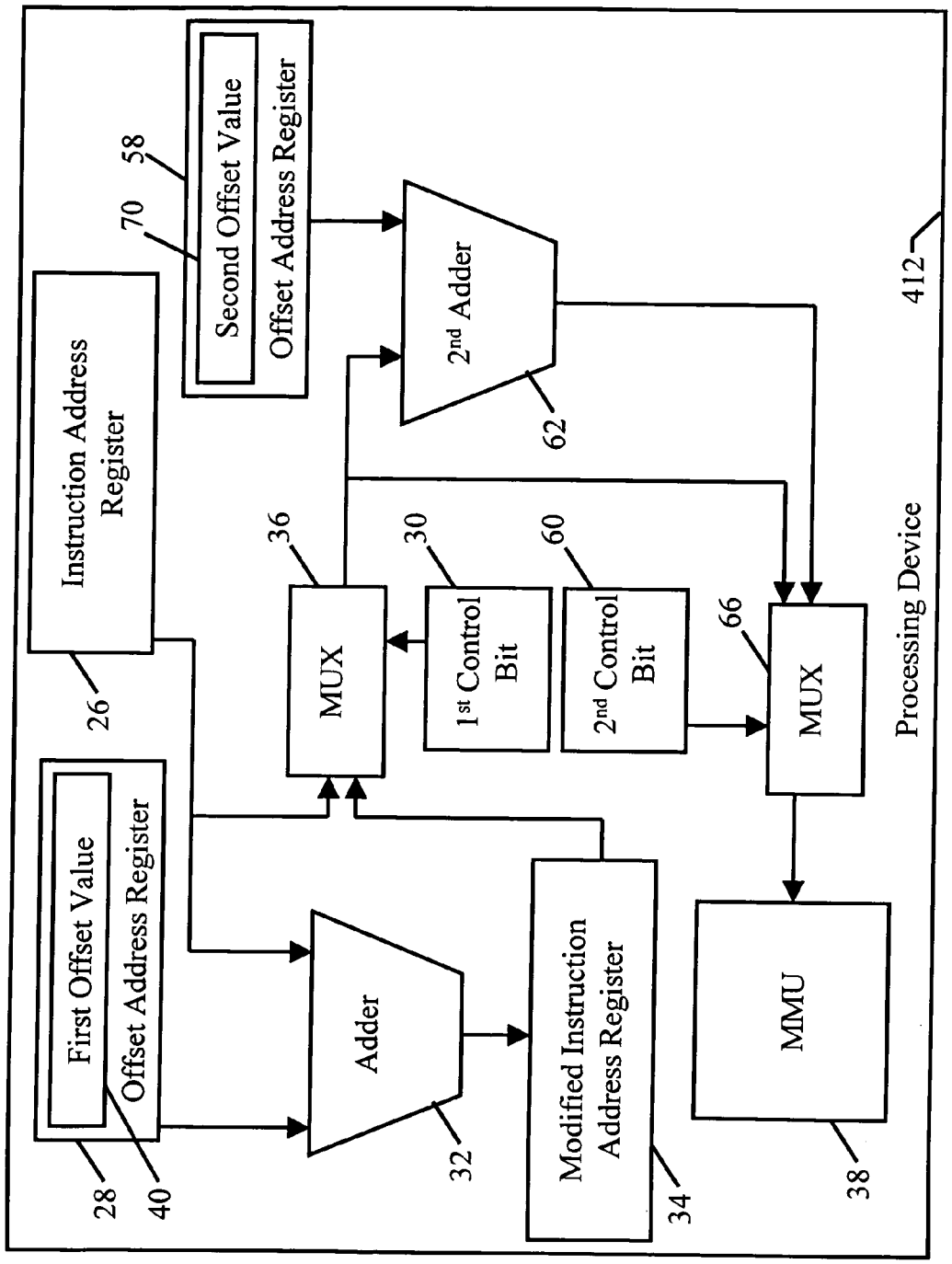
FIG. 5 is a block diagram of the processor of the multiple execution-path flash system of FIG. 4.

FIG. 4 is a block diagram illustrating a multiple execution-path flash system 410 with a redundant memory device 44. The redundant memory device 44 can be any type of non-volatile memory such as a flash memory device. The redundant memory device 44 includes a redundant flash image 45 including a primary power-on self test ("POST") executable file ("post executable") 46, a primary Boot executable file ("boot executable") 48, a redundant exception handling executable file ("redundant exception handler") 50, a secondary post executable 52, and a secondary Boot executable 54. Additionally, the processor 412 includes a second offset address register 58, a second offset bit 60, and a second adder 62, as illustrated in FIG. 5.

The redundant memory device 44 has a starting physical address which is offset from the starting physical address of the main memory device 14 by a second offset value 70. The second offset value 70 is held in the second offset address register 58 and is added to the output of the first adder 32 by the second adder 62 if the second offset bit 60 is a logic high. The second offset bit 60 controls the second multiplexor 66, passing either the output of the first multiplexor 36 or the second adder 62 to the MMU 38. In this embodiment of the invention, the main exception handler 20 sets the second offset bit to a logic high if corrupted data is encountered at the same relative address within the primary and secondary executables 16,18,22,24. In this manner, control is passed to the corresponding executables 46,48,52,54 within the redundant flash image 45.

Figure 6:
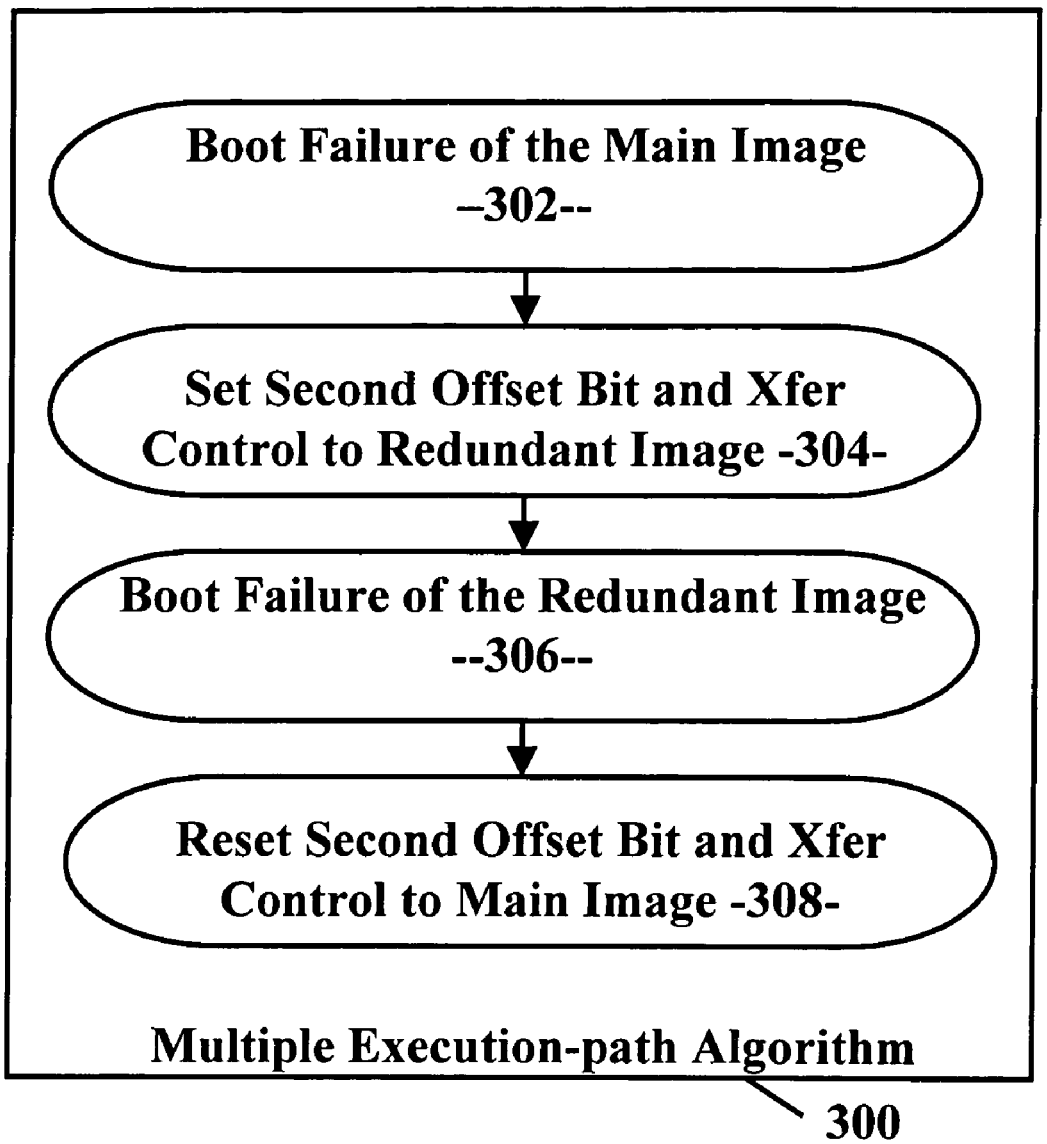
FIG. 6 is a flow chart illustrating a multiple execution-path algorithm utilizing main and redundant memory devices according to the invention.

As with the main flash image 15, a problem in the primary executables 46,48 will invoke the redundant exception handler 50 which will set the first offset bit 30, resulting in control passing to the secondary executables 52,54. Likewise, a problem in the secondary executables 52,54 will result in the redundant exception handler 50 resetting the first offset bit 30, returning control to the primary executables 46,48. If corrupted information is encountered at the same relative addresses within the primary executables 46,48 and the secondary executable 52,54, the redundant exception handler 50 will reset the second offset bit 60, resulting in control passing to the executables 16,18, 22,24 of the main flash image 15. In this embodiment of the invention, the Boot process will only fail if corrupt data exists at the same relative addresses within the primary and secondary executables of both the main and redundant flash images. This process is more fully illustrated by the multiple execution-path algorithm 300 as shown in FIG. 6.

In step 302, corrupted information is encountered at the same relative addresses within the primary executables 16,18 and the secondary executables 22,24 of the main flash image 15. In step 304, the main exception 20 handler sets the second offset bit 60 resulting in control passing to the second flash image 45. In step 306, corrupted information is encountered at the same relative addresses within the primary executables 46,48 and the secondary executables 52,54 of the redundant flash image. In step 308, the redundant exception handler 50 resets the second offset bit 60 resulting in control passing to the main flash image 15.

Figure 7:
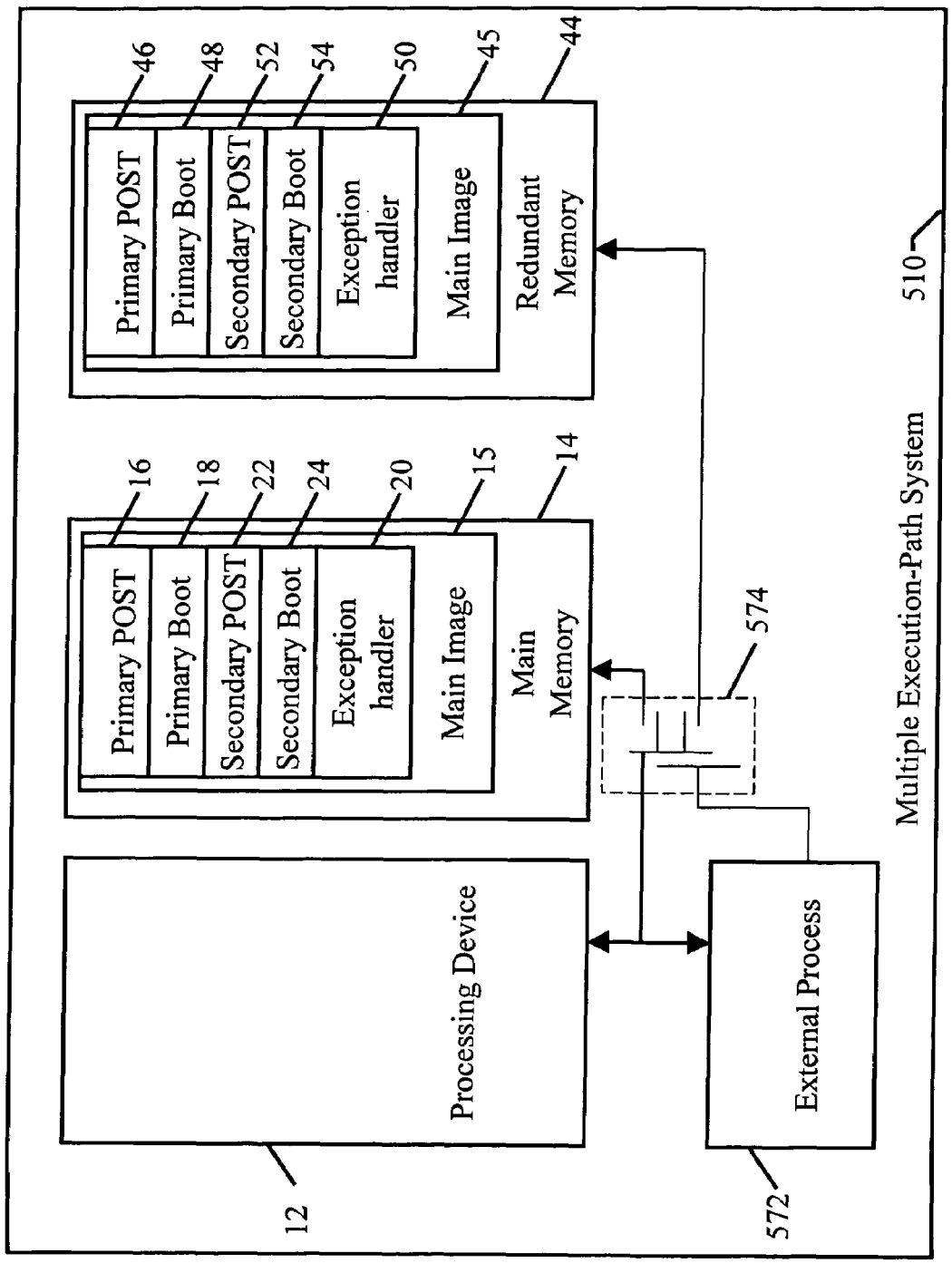
FIG. 7 is a block diagram of a multiple execution-path system including an external process and a switch.
Figure 8:
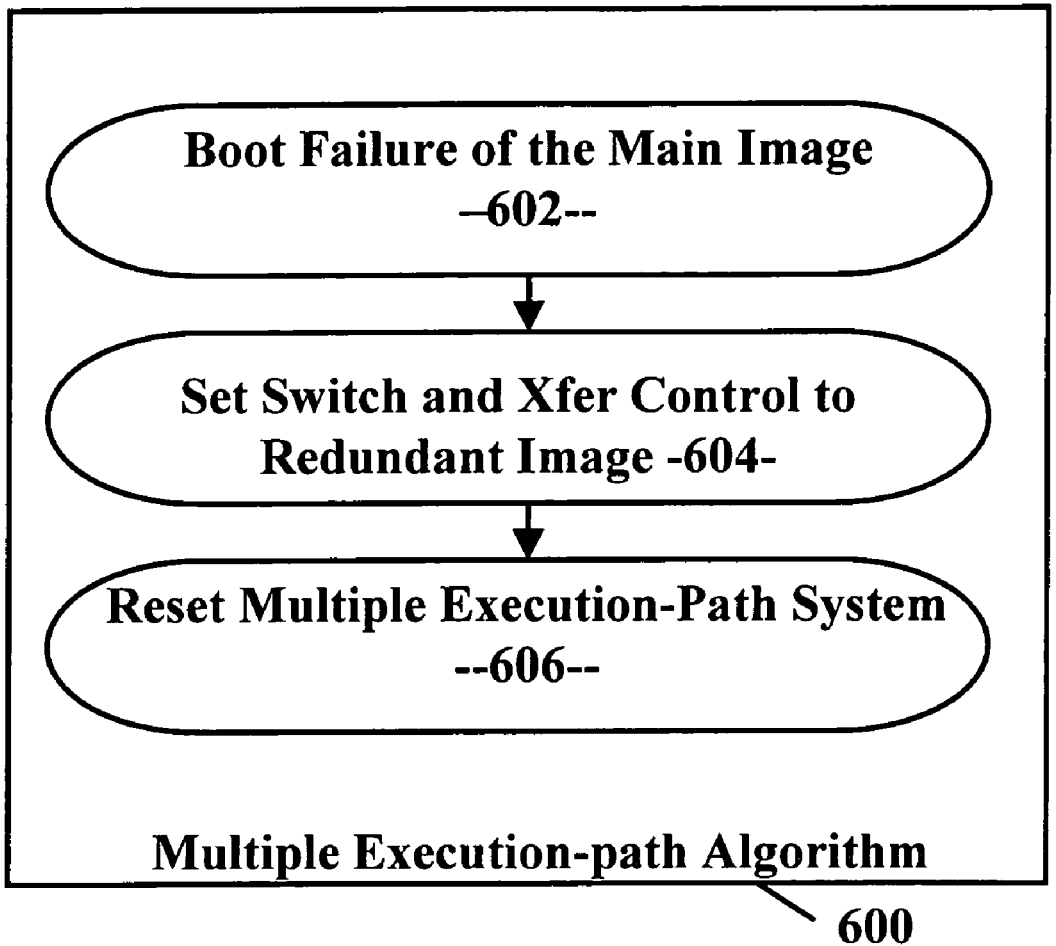
FIG. 8 is a flow chart illustrating a multiple-execution path algorithm utilizing an external process and a switch according to the invention.

Yet another embodiment of the invention is illustrated by the block diagram of FIG. 7. The multiple execution-path flash system 510 is monitored by an external process 572. This external process 572 may reside in a processing device within a general purpose computer, a server, or another embedded system such as an input/output adapter. A corresponding multiple execution-path algorithm 600 is illustrated in FIG. 8. In step 602, the external process 572 monitors the main exception handler 20 for an indication that both the primary executables 16,18 and the secondary executables 22,24 have failed at the same relative addresses. If this indication is detected by the external process 572, the external process sets a switch 574 which transfers control from the main memory device 14 to the redundant memory device 44 in step 604. In step 606, the external process 572 resets the multiple execution-path flash system 510, allowing the system to POST and Boot from the redundant memory device 44. If the Boot from the redundant memory device fails, then the memory devices 14,44 must be reprogrammed or the multiple execution-path system 510 must be replaced.

Those skilled in the art of making systems that POST and Boot from non-volatile memory may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A method of creating a multiple execution path, comprising the steps of:
   detecting corrupt information within a main primary executable file residing in a main image within a main memory device; and
   transferring a control of a Boot process from the main primary executable file to a main secondary executable file residing in the main image in response to said step of detecting corrupt information, wherein the main secondary executable file is identical to the main primary executable file upon being written to the main memory device.

2. The method of claim 1, wherein the step of detecting corrupt information within a main primary executable file is performed by a main exception handling executable file residing in the main image.

3. The method of claim 1, wherein the main memory device is a flash memory device.

4. The method of claim 1, further comprising the steps of:
   detecting corrupt information within the main secondary executable file; and
   transferring the control of the Boot process from the main secondary executable file to a main primary executable file residing in the main image.

5. The method of claim 1, further comprising the steps of:
   detecting corrupt information within the main secondary executable file; and
   transferring the control of the Boot process from the main image to a redundant image.

6. The method of claim 4, further comprising the steps of:
   detecting corrupt information at a first location within the main primary executable file and a first same relative location within the main secondary executable file; and
   transferring the control of the Boot process from the main image to a redundant image.

7. The method of claim 6, further comprising the steps of:
   detecting corrupt information at a second location within a redundant primary executable file and a second same relative location within a redundant secondary executable file; and
   transferring the control of the Boot process from the redundant image to the main image.

* * * * *